United States Patent
Lindsey

(10) Patent No.: US 7,298,110 B2
(45) Date of Patent: Nov. 20, 2007

(54) INTEGRATED MOTOR MONITORING SYSTEM

(75) Inventor: Robert Wayne Lindsey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/236,609

(22) Filed: Sep. 28, 2005

(65) Prior Publication Data

US 2007/0069678 A1    Mar. 29, 2007

(51) Int. Cl.
*H02P 7/00* (2006.01)
(52) U.S. Cl. .................. 318/490; 318/444; 318/495
(58) Field of Classification Search ............... 318/434, 318/490, 491, 495, 444
See application file for complete search history.

(56) References Cited

U.S. PATENT DOCUMENTS

| | | | | |
|---|---|---|---|---|
| 4,194,178 A | | 3/1980 | Dumbeck | 340/201 R |
| 4,544,982 A | * | 10/1985 | Boothman et al. | 361/96 |
| 4,639,714 A | | 1/1987 | Crowe | 340/310 R |
| 4,749,933 A | * | 6/1988 | ben-Aaron | 318/810 |
| 4,788,448 A | | 11/1988 | Crowe | 307/31 |
| 4,920,810 A | * | 5/1990 | Orr et al. | 73/865.5 |
| 4,998,097 A | * | 3/1991 | Noth et al. | 340/648 |
| 5,510,687 A | | 4/1996 | Ursworth et al. | 318/727 |
| 5,524,083 A | * | 6/1996 | Horne et al. | 700/293 |
| 5,529,307 A | * | 6/1996 | Chang | 473/136 |
| 5,622,221 A | * | 4/1997 | Genga et al. | 165/208 |
| 5,625,276 A | * | 4/1997 | Scott et al. | 322/24 |
| 5,670,931 A | | 9/1997 | Besser et al. | 340/310.01 |
| 5,740,031 A | | 4/1998 | Gagnon | 364/145 |
| 5,814,900 A | | 9/1998 | Esser et al. | 307/104 |
| 6,271,609 B1 | * | 8/2001 | Hollenbeck et al. | 310/71 |
| 6,307,764 B1 | | 10/2001 | Peek et al. | 363/125 |
| 6,326,704 B1 | | 12/2001 | Breed et al. | 307/9.1 |
| 6,435,169 B1 | * | 8/2002 | Vogt | 123/568.23 |
| 6,483,204 B2 | | 11/2002 | Hanaki | 307/23 |
| 6,529,135 B1 | | 3/2003 | Bowers et al. | 340/648 |
| 6,624,606 B2 | | 9/2003 | Kushida et al. | |

(Continued)

FOREIGN PATENT DOCUMENTS

DE    100 14 183    10/2001

(Continued)

OTHER PUBLICATIONS

Coakley et al. (Apr. 2, 1999). "Real-Time Control of Serrosystem Using the Inverter-Fed Power Lines to Communicate Sensor Feedback" vol. 46 #2 IEEE Transactions on Industrial Electronics. XP011023490 ISSN: 0278-0046.

*Primary Examiner*—Rita Leykin
(74) *Attorney, Agent, or Firm*—Finnegan, Henderson, Farabow, Garrett & Dunner

(57) ABSTRACT

An integrated motor monitoring system includes a housing and a motor disposed within the housing, the motor being configured to provide a power output. The integrated motor monitoring system also includes at least one monitoring device communicatively coupled to the motor and configured to monitor an operational aspect of the motor and generate a data signal associated with the operational aspect. The integrated motor monitoring system further includes a controller, disposed within the housing and in communication with the at least one monitoring device, and configured to energize a plurality of field conductors of the motor and receive the data signal from the at least one monitoring device over at least one of the plurality of field conductors.

25 Claims, 4 Drawing Sheets

U.S. PATENT DOCUMENTS

| | | | |
|---|---|---|---|
| 6,714,138 B1 * | 3/2004 | Turner et al. | 340/854.3 |
| 6,841,961 B2 * | 1/2005 | Andersson et al. | 318/490 |
| 6,901,212 B2 | 5/2005 | Masino | |
| 2002/0080010 A1 | 6/2002 | Zhang | 340/310.06 |
| 2003/0169009 A1 | 9/2003 | Henry | |
| 2003/0185027 A1 | 10/2003 | Yokoo et al. | 363/87 |
| 2004/0148632 A1 | 7/2004 | Park et al. | 725/81 |

FOREIGN PATENT DOCUMENTS

| | | |
|---|---|---|
| WO | WO 93/01575 | 1/1993 |

* cited by examiner

INTEGRATED MOTOR MONITORING SYSTEM

TECHNICAL FIELD

This application relates generally to a motor control system and method and, more particularly, to an integrated motor monitoring system for a work machine.

BACKGROUND

Today's work machines are employed in a number of machines used in industries such as manufacturing, mining, construction, and/or agriculture. These work machines generate a large amount of energy for performing a variety of tasks. Most work machines include a power source such as, for example, a diesel engine, a gasoline engine, a natural gas engine, or another appropriate power source that provides energy to complete a task. In certain work machines, the power source is coupled to a motor that drives one or more mechanical devices that may perform a particular function associated with the power system.

Typically, these motors are operated under peak loading conditions for extended periods of time and, often, in extremely harsh environments. While these motors may be capable of operating under demanding conditions, the strain of continuous operation at peak loading can lead to damage to various components of the motor. For example, a sustained overload condition, if not properly monitored and/or controlled, may cause overheating of the conductive windings of the motor that could lead to permanent conductor damage and/or failure of the motor.

These motors may be protected from potential damage by monitoring and regulating the operation of the motor. One system, as described in U.S. Pat. No. 4,194,178 issued to Dumbeck (hereinafter referred to as "the '178 patent") on Mar. 18, 1980, has been developed to monitor the load on a motor by measuring the shaft rotation of the motor and wirelessly transmitting the monitored data over the power windings of the motor by inducing an RF signal onto the power windings. The system of the '178 patent includes a detector and slip analysis circuit mounted within the motor housing, a modulator, and transmitter mounted within the motor housing that impress a modulated motor load signal of radio frequency onto the line that supplies power to the motor. A receiver outside the motor receives the modulated signal, and a demodulator transforms the received signal to produce the motor load signal. The system of the '178 patent also includes a corrective means to correct the motor load signal for variations caused by power line voltage fluctuations.

Although the system of the '178 patent may be capable of monitoring the operation of the motor over the power lines, this system may be unreliable. For example, because the monitoring system relies on current induction and indirect coupling methods for data transfer to wirelessly transmit data, as opposed to using direct electrical connections, the RF signals transferred over the power lines may be susceptible to electromagnetic interference, both internal and external to the motor. This interference may corrupt the monitored data, potentially resulting in unreadable or erroneous motor data.

Furthermore, the system of the '178 patent does not provide a continuous electrical connection capable of providing power to operate the motor. For example, because an induction method is used to wirelessly transfer the RF signals over the motor power windings, the system of the '178 patent is limited to output powers less than 100 milliwatts, which may be too low to energize the field windings of the motor enough to provide mechanical motion of the rotor.

In addition, because the system of the '178 patent does not provide a direct electrical connection to the motor, additional wiring harnesses and control systems are still required to operate the motor, which could substantially increase the manufacturing and production costs of the motor. Moreover, the inclusion of power wiring within the motor housing increases the risk of noise for the RF data monitoring link, which may result in further degradation of the RF signal quality and reliability.

The presently disclosed integrated motor monitoring system and method are directed toward overcoming one or more of the problems set forth above.

SUMMARY OF THE INVENTION

In accordance with one aspect, the present disclosure is directed toward an integrated motor monitoring system. The integrated motor monitoring system may include a housing and a motor disposed within the housing, the motor being configured to provide a power output. The integrated motor monitoring system may also include at least one monitoring device communicatively coupled to the motor and configured to monitor an operational aspect of the motor and generate a data signal associated with the operational aspect. The integrated motor monitoring system may further include a controller, disposed within the housing and in communication with the at least one monitoring device, and configured to energize a plurality of field conductors of the motor and receive the data signal from the at least one monitoring device over at least one of the plurality of field conductors.

According to another aspect, the present disclosure is directed toward a method for monitoring a motor. The method may include energizing a plurality of field conductors of a motor. The method may also include monitoring a current of at least one of the plurality of field conductors. The method may further include enabling data communication over the at least one of the plurality of field conductors, based on the monitored current.

DETAILED DESCRIPTION

Figure 1:
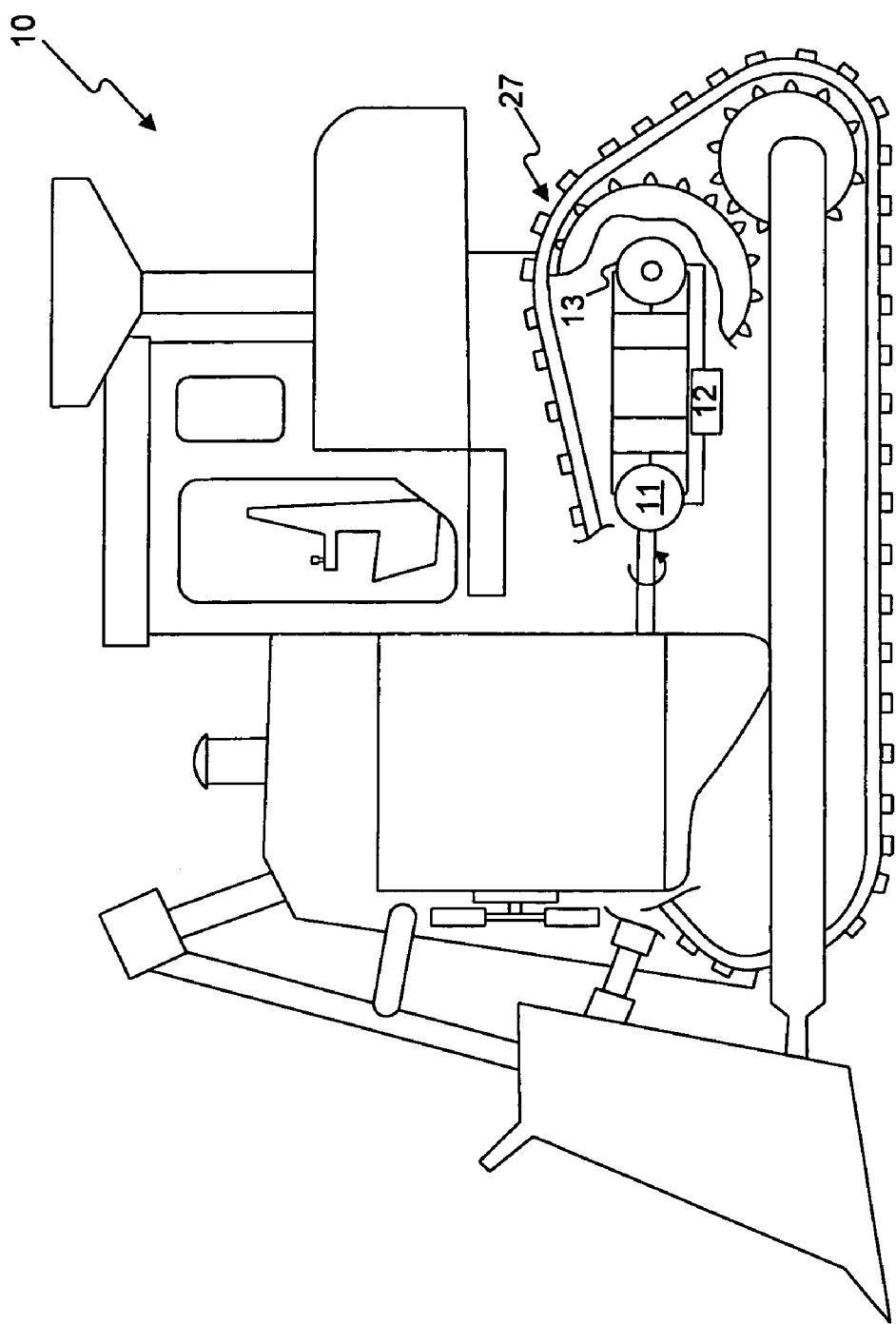
FIG. 1 is a diagrammatic illustration of an exemplary disclosed work machine.

FIG. 1 illustrates an exemplary disclosed work machine 10 having a plurality of components that cooperate to perform a task associated with an industry such as mining, construction, agriculture, manufacturing, transportation or any other industry. Work machine 10 may include a work machine, such as a track-type tractor, a skid steer loader, a motor grader, an excavator, an on-highway truck, or any such type of machine. Work machine 10 may include, among other things, a power source 11 to generate a power output, an electronic control unit (ECU) 12 to monitor and/or control one or more motors of work machine 10, and an integrated motor monitoring system 13 to perform one or more tasks associated with work machine 10. Although work machine 10 is illustrated as a mobile work machine, alternate embodiments of work machine 10 may include any other type of mobile or stationary machine operable to perform a task such as, for example, an industrial generator set, a manufacturing assembly line equipment system, an industrial power system, a stationary engine, an off-highway vehicle, or any other type of machine.

Power source 11 may include one or more components configured to output electric energy for use by one or more components of work machine 10. For example, power source 11 may include a generator coupled to an internal combustion engine for converting at least a portion of the mechanical energy output from the internal combustion engine to electric energy, as shown in FIG. 1. Alternatively, power source 11 may include any type of device configured to output electrical energy such as, for example, a fuel cell, a battery, a turbine, an alternator, or any other appropriate device.

Electronic control unit 12 may include one or more components configured to monitor and/or control a plurality of electrical and/or mechanical components associated with work machine 10. For example, electronic control unit 12 may include one or more data sensors (not shown) to monitor the status of the components, an on-board diagnostic system (not shown) to analyze monitored data, and various components (not shown) for running software applications to store, distribute, and process component data. For example, electronic control unit 12 may include a central processing unit (CPU), a computer-readable memory, a read only memory (ROM), a random access memory (RAM), input/output (I/O) elements, etc. Electronic control unit 12 may include a central data collector for an industrial power system, a powertrain control module (PCM) for a vehicle, an on-board diagnostic system for a work machine, or any other appropriate device or system for monitoring and controlling work machine 10.

Figure 2:
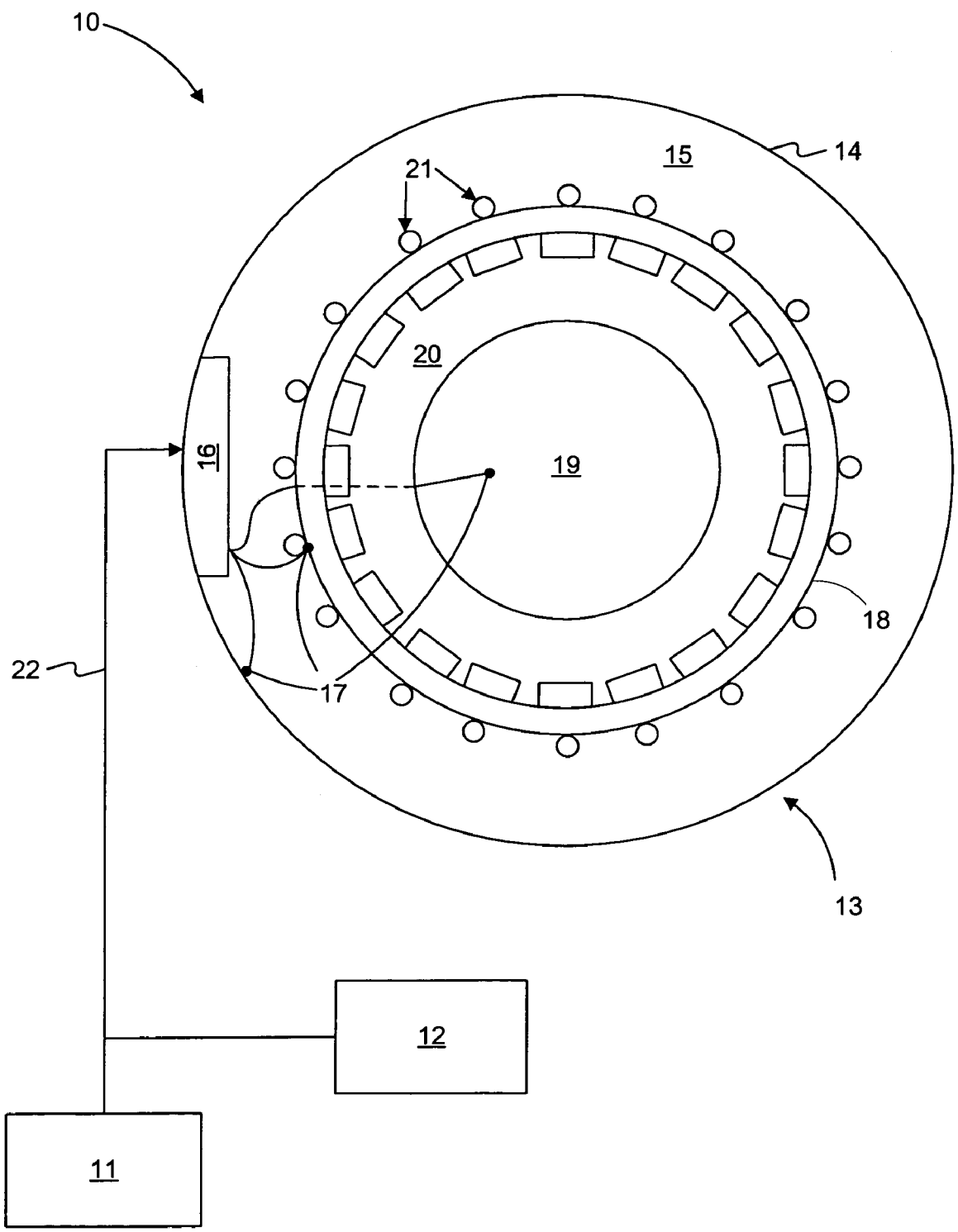
FIG. 2 provides a diagrammatic illustration of an exemplary disclosed integrated motor monitoring system.

As illustrated in FIG. 2, integrated motor monitoring system 13 may include various components for integrating motor monitor, control, and operation functions into a single, compact unit. For example, integrated motor monitoring system 13 may include among other things, a housing 14, a motor 15 to provide mechanical power output, a controller 16 to monitor and regulate the operation of motor 15, and one or more monitoring devices 17 that generate signals in response to one or more operational aspects of motor 15. Although integrated motor monitoring system 13 is illustrated as a standalone motor/controller/monitoring unit, it is contemplated that integrated motor monitoring system 13 may be included as part of a larger equipment system. For example, a shaft may be drivingly coupled to the motor to operate one or more traction devices 27 to propel work machine 10.

Housing 14 may contain one or more components of integrated motor monitoring system 13 and may be configured to isolate the components from the surrounding environment. For example, housing 14 may contain motor 15, controller 16, and data monitoring devices 17. Housing 14 may include a waterproof, sealable opening through which one or more wires may be passed. Housing 14 may be constructed from various materials such as, for example, a polymer, aluminum, an alloy metal, steel, PVC, rubber, or any other suitable material.

Motor 15 may be disposed within housing 14 and may be configured to provide mechanical force for performing a task associated with work machine 10. Motor 15 may include a stator 18 electromagnetically coupled to a rotor 19 and separated by an air gap 20 over which an electromagnetic field is induced. Motor 15 may also include field conductors 21 for supplying electrical energy to induce an electromagnetic field between stator 18 and rotor 19. Although motor 15 is illustrated as a brushless DC motor, it is also contemplated that motor 15 may include any appropriate type of motor for providing mechanical energy output such as, an AC induction motor, a universal motor, a linear motor, a pulse drive, a switched reluctance motor or any other type of motor.

Controller 16 may be communicatively coupled to motor 15 and may include one or more components that may be configured to monitor one or more operational characteristics of motor 15. For example, controller 16 may be in communication with one or more monitoring devices 17 configured to provide information indicative of operational characteristics of motor 15. Controller 16 may constitute a standalone unit separate from motor 15 within housing 14 or, in an alternative embodiment, may be integral to motor 15, as part of electronic power circuitry associated with motor 15.

Controller 16 may be communicatively coupled to power source 11 and/or electronic control unit 12 via a power wire 22. Power wire 22 may include any electric coupling medium suited for transferring data and power signals such as, for example, metallic wires, power buses, electric cables, conductive laminations, conductive-traces, semiconductor power channels, or any other appropriate media for transmission of data information and power signals. Data information may be transmitted using an analog format, a digital format, or any combination thereof to communicate information over power wire 22.

Controller 16 may be operatively coupled to electronic control unit 12 and configured to communicate data information over power wire 22. For example, controller 16 may transmit data information corresponding to the operational characteristics of motor 15 to electronic control unit 12 over power wire 22 to minimize the number of connections between controller 16 and electronic control unit 12.

Figure 3:
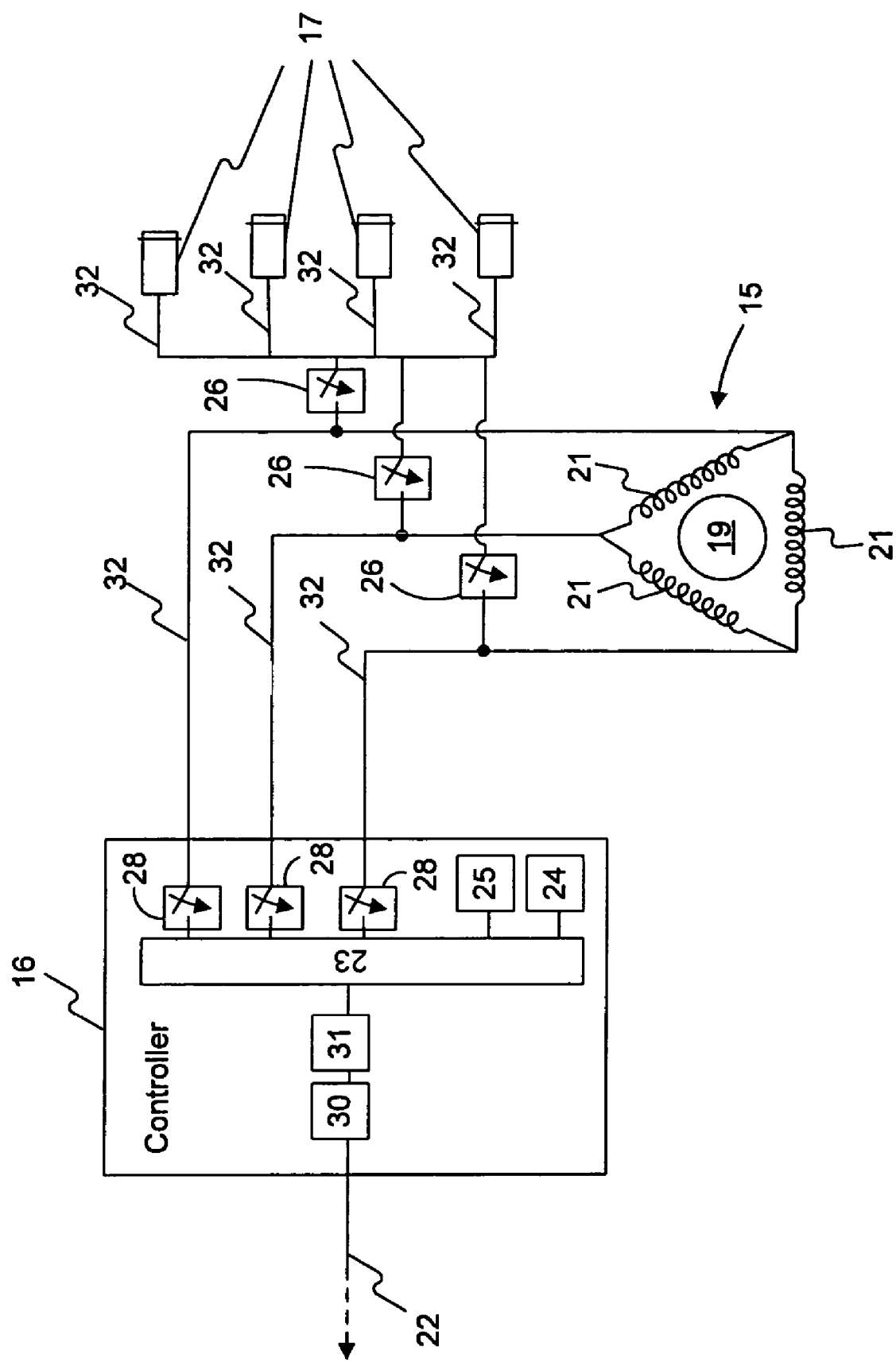
FIG. 3 provides a schematic illustration of an exemplary disclosed integrated motor monitoring system.

As illustrated in FIG. 3, controller 16 may be electrically coupled to field conductors 21 of motor 15 and may include one or more components adapted to energize field conductors 21. For example, controller 16 may include a plurality of electronic components that cooperate to provide power signals to field conductors 21 to operate motor 15 such as, for example, an array of switches 28 to sequentially energize field conductors 21 of motor 15. Alternatively and/or additionally, it is contemplated that various devices may be used to provide power signals to field conductors 21 for motor operation and control such as, for example, a timing circuit coupled to one or more IGBT transistors, MOSFET transistors, an off-the-shelf pulse modulating circuit, or any other appropriate device adapted to controllably energize field conductors 21.

Controller 16 may include one or more components configured to manage and/or control data communication throughout integrated motor monitoring system 13. For example, controller 16 may include a modulator/demodulator 30 to format various communication signals, a multiplexer/demultiplexer 31 to integrate various communication signals onto a single transmission medium, and one or more input/output devices (not shown) for transmitting and receiving data information. In some embodiments, it is contemplated that controller 16 may include alternative and/or additional components such as filters, mixers, amplifiers, switches, network controller, or other devices in combination with or in substitution for those illustrated in the exemplary embodiment.

Controller 16 may be selectively coupled to field conductors 21 and configured to receive data signals from monitoring devices 17. For example, controller 16 may be in data communication with field conductors 21 via switches 28. Controller 16 may be in data communication with monitoring devices 17 via one or more sensor switches 26. Controller 16 may be configured to receive one or more operational aspects of motor 15 from one or more monitoring devices 17 over one or more field conductors 21.

Controller 16 may include various components for running software applications. For example, controller 16 may include a central processing unit (CPU) 23, a computer-readable memory 24, a read only memory (ROM) 25, a, random access memory (RAM) (not shown), input/output (I/O) elements (not shown), etc. CPU 23 may be configured to execute one or more software applications stored in computer readable memory to analyze data information supplied by monitoring devices 17. Controller 16 may be further configured to store, receive, transmit, and analyze data information by executing software applications stored in computer-readable memory 24.

Monitoring devices 17 may include one or more sensors operatively coupled to motor 15 and adapted to respond to one or more operational characteristics associated with motor 15. Monitoring devices 17 may include any device sensitive to a particular characteristic related to the operation of motor 16 such as, for example, a temperature sensor, a pressure, sensor, a vibration sensor, a voltmeter, an ammeter, a position sensor, or any appropriate sensor for sensing an aspect of motor operation.

Monitoring devices 17 may be communicatively coupled to controller 16 and may be configured to provide data information over a common information bus. For example, monitoring devices 17 may be arranged in array format such that a plurality of monitoring devices 17 may provide information over one or more field conductors 21. Furthermore, monitoring devices 17 may be selectively coupled to one or more field conductors 21 via one or more sensor switches 26 configured to provide selective data communication to controller 16 over field conductors 21 during periods of field conductor inactivity. Alternatively and/or additionally, monitoring devices 17 may be continuously coupled to field conductors 21 using low frequency blocking circuitry or other isolation circuitry to prevent short circuiting of field conductors or otherwise interfering with normal motor commutation sequence or operation.

One or more sensor switches 26 may electrically couple monitoring devices 17 to field conductors 21 of motor 16 to provide a selective data flow path of data information to controller 16. For example, as illustrated in FIG. 3, sensor switches 26 may be operated to electrically couple monitoring devices 17 to field conductors 21. Sensor switches 26 may include any type of electrical or mechanical switching device such as, for example, a mechanical actuator, an electrical relay, a MOSFET or IGBT switch, a electric diode switch, a solenoid, a pulse transformer or any appropriate device configured to provide a selective electrical connection, current or data flow. Furthermore, although sensor switches 26 are illustrated as self-actuating switches (e.g., MOSFET or IGBT switches based on current flowing in field conductors 21), they may be mechanically controlled switches coupled to controller 16.

Switches 28 may include various components for providing selective current flow paths between power source 11 and motor 15. For example, switches 28 may include electro-mechanical switches configured to receive external commands from controller 16, micro-electro-mechanical system (MEMS) switches adapted to operate based on a predetermined voltage or current tolerance, Bipolar transistor, MOSFET, IGBT, GTO switches, or any other appropriate switch for selectively coupling power source 11 and motor 15.

Switches 28 may be operatively coupled to controller 16 and may be configured to operate (e.g., open and close) based on control signals received from controller 16. For example, switches 28 may be collectively commanded by controller 16 to operate in a particular sequence. Switches 28 may selectively provide the current flow paths based on the commands received from controller 16. Switches 28 may be further configured to provide a data signal indicative of the present state (e.g., open or closed) of the particular switch to controller 16, for analysis and timing adjustments. In an alternative embodiment, switch commands may be in the form of a gate current supplied by controller 16, to open and close a current channel in an integrated circuit to selectively provide the switching function. It is contemplated that various methods may be employed for providing the switching control functions for switches 28.

Switches 28 may be coupled to power source 11 and may be configured to provide a selective current flow path to field conductors 21 of motor 15. For example, power source 11 may include a DC power supply configured to provide a constant output power. Switches 28 may be configured to cooperatively operate to supply portions of the DC power signal to the field conductors 21 of motor 15. Alternatively, power source 11 may include an AC power supply configured to provide a time-varying output power signal. Switches 28 may be configured in such a way as to provide portions of the AC power signal to field conductors 21 of motor 15. Alternatively, switches 28 may be operated collectively, as an array, to effectively modify or modulate the power signal provided by power source 11 before energizing field conductors 21.

Transmission lines 32 may include any electric coupling device suited for providing data and power signals such as, for example, metallic wires, power buses, electric cables, conductive laminations, conductive traces, semiconductor power channels, or any other appropriate media for transmission of data information and power signals. Data information may be transmitted using an analog format, a digital format, or any combination thereof to communicate information over transmission lines 32.

INDUSTRIAL APPLICABILITY

The disclosed integrated motor monitoring system may be applicable to any system where an integrated, compact, and reliable motor control system may be advantageous. More specifically, the disclosed integrated electric control system may provide an integrated monitoring and control system for a motor for providing data monitoring signals over power wiring. The operation of integrated motor monitoring system 13 will now be described.

Figure 4:
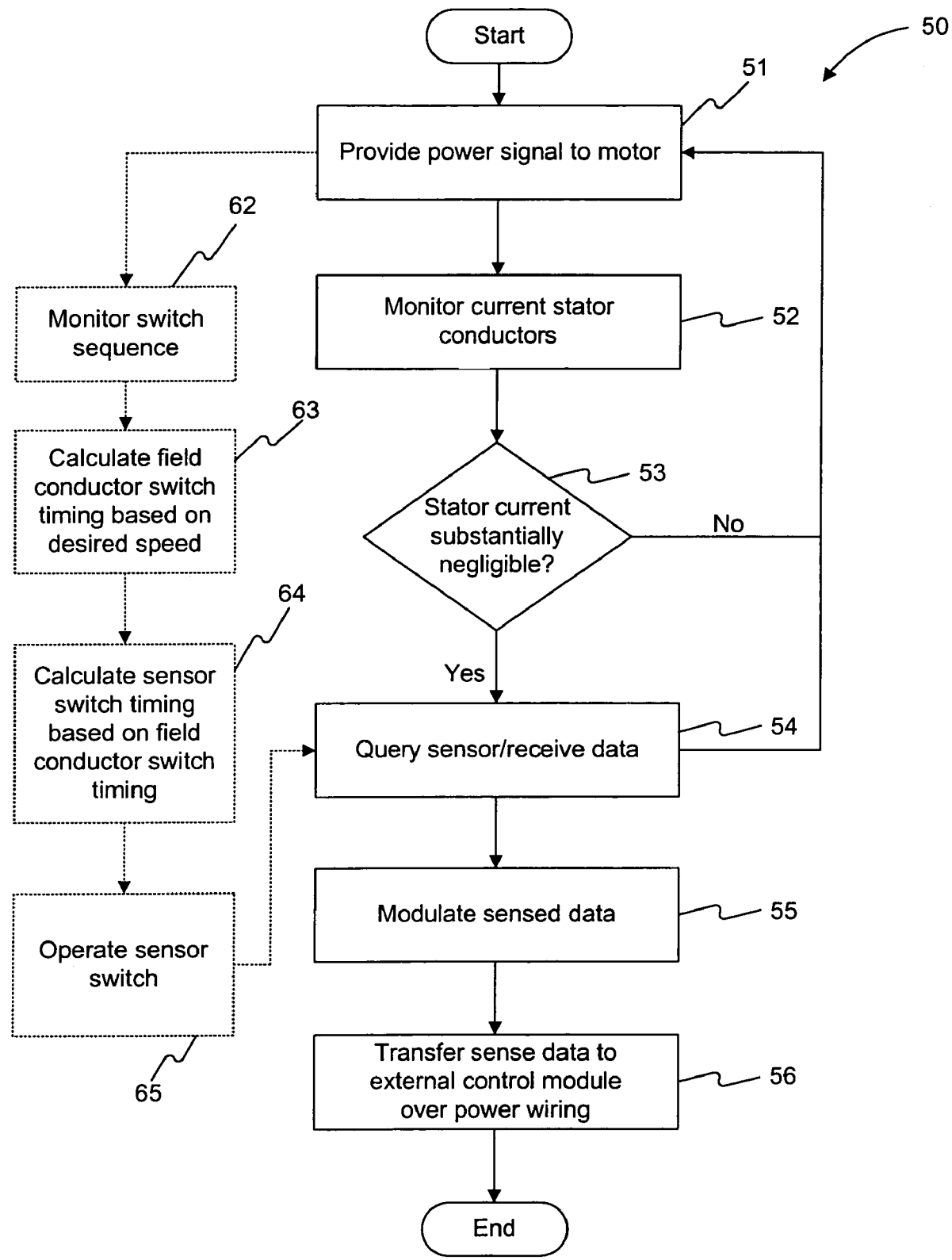
FIG. 4 illustrates a flowchart depicting an exemplary disclosed method for operating the integrated motor monitoring system of FIG. 2.

As illustrated in flowchart 50 of FIG. 4, operation of integrated motor monitoring system 13 is initiated when a power signal is applied to motor 15 (Step 51) by controller 16. Controller 16 may receive a power signal from power source 11 and energize field conductors 21 of motor 15. For example, one or more switches 28 associated with controller 16 may be sequentially operated to selectively provide power signals in the form of current flow through one or more field conductors 21. The sequencing of operation of switches 28 provides different current flow through each of field conductors 21, generating a varying electromagnetic field. This varying electromagnetic field acts upon rotor 19 to generate angular velocity to provide torque output. The sequencing of the operation of switches 28 may be precisely coordinated by controller 16 in order to provide maximum operational control of the operational characteristics of motor 15.

Upon start-up of motor 15, the current supplied to the field conductors over transmission lines 32 may be monitored (Step 52). A current monitoring device may be associated with each field conductor to measure the current in each of field conductors 21. For example, controller 16 may include an ammeter (not shown) electrically coupled to transmission lines 32 to monitor the current through each of transmission lines 32. Because switches 28 may be configured to selectively enable current flow through each of the field conductors 21, the instantaneous current on each of the field conductors 21 may be substantially different. Current data may be provided to controller 16 and monitored by CPU 23.

Each current monitoring device may continuously monitor the current in a field conductor until the current in one or more field conductors 21 is substantially negligible, which may be pre-designated as an "off" state (Step 53). Controller 16 may receive data associated with the current levels of each of field conductors 21 and may determine if the current is below a predetermined threshold, based on historical and/or predetermined specification data associated with motor 15.

If the monitored current of one or more field conductors 21 drops below the predetermined threshold amount, a query may be sent to one or more monitoring devices 17, and data may be received from the monitoring devices 17 in response to the query (Step 54). The received data may be stored in computer readable memory 24, analyzed by CPU 23 to determine the status of the operation of motor 15, and/or used to modify the operation of motor 15. Upon receipt of the data from monitoring devices 17, current monitoring devices may continue to monitor current through one or more field conductors 21.

Controller 16 may receive data information indicative of an operation of motor 15 and may modulate the received data information for transmission over power wire 22 (Step 55). For example, a plurality of data signals may be received by controller 16. As a result, controller 16 may modulate the data using a variety of methods to distinguish each signal from the other during transmission over power wire 22. Furthermore, controller 16 may modulate data signals to efficiently and reliably transfer data signals over power wire 22 in the presence of power signals on power wire 22, using one or more modulation techniques such as, for example, frequency modulation, amplitude modulation, pulse-tone modulation, phase modulation, or any other appropriate modulation technique. In addition to modulation, the signals may be multiplexed so that a plurality of modulated signals may be integrated into a single signal. This integration may allow a large amount of information to be arranged to allow faster signal transmission, thereby reducing the opportunity for data collusions, attenuation, and interference during transmission over power wire 22.

Data signals may be transferred to electronic control unit 12 over power wire 22 (Step 56). For example, once data signals have been appropriately modulated and formatted for transmission, controller 16 may transmit the data to electronic control unit 12 over power wire 22. Because data signals have been modulated and/or formatted, interference between data signals and power signals may be reduced.

An alternative series of method steps for operating integrated motor monitoring system 13 is illustrated by steps 62-65 of flowchart 50 of FIG. 4. Controller 16 may be configured to monitor the switch sequence of electric drive 27 (Step 62) and calculate a switch timing associated with the energizing of field conductors 21 (Step 63). For example, switches 28 associated with electric drive 27 may operate based on current supplied to the field windings to achieve a desired output torque of motor 15. To maintain the desired output torque, the specific sequence of switching may be calculated by controller 16.

During an "off" state of one or more switches 28, controller 16 may determine a sensor switch timing (Step 64) to operate one or more sensor switches 26 to provide a selective data flow path over the one or more field conductors 21 (Step 65). Sensor switches 26 may communicatively couple an array of monitoring devices 17 to controller 16 via field conductors 21. When a field conductor 21 is not energized, data communication is provided over a data flow path between monitoring devices 17 and controller 16 by operating one or more sensor switches 26. Upon operating the sensor switch, integrated motor monitoring system 13 may continue in sequence with Step 54, as previously described.

Because controller 16 may be included within the motor housing and may be configured to receive data information over motor conductors, integrated electric motor control system 13 may substantially reduce manufacturing costs. For example, monitor and control systems in a single unit may benefit from the use of shared resources such as, for example, CPU, memory, RAM, communication electronics, etc. Moreover, costs associated with providing multiple units, each containing dedicated components, may be minimized. Furthermore, because data information may be transmitted using existing power wiring, manufacturing, maintenance, and replacement costs of wires, connectors, and wiring harnesses may also be reduced.

In addition, by combining motor control and monitoring functions in a single unit system, complexity may be reduced, minimizing system downtime and increasing productivity. For example, separate units may require maintenance and repair at different times, essentially increasing the likelihood of extended periods of equipment unproductiveness. However, by integrating the monitor and control functions in a single, compact unit the entire unit may be repaired or replaced simultaneously, which may decrease maintenance and/or repair down-times.

Integrated motor monitoring system 13 may increase motor reliability by providing motor control capability based on monitored data. For example, because motor monitoring functions are implemented by controller 16, operation and/or regulation of motor 15 may be controlled based upon the monitored characteristics of motor operation. As a result, operational aspects of motor 15 such as, for example, motor speed, torque output, field conductor current, or other operational aspects may be controlled based on operational characteristics of motor 15 such as temperature, vibration, acoustic noise, or field conductor overload. In the event of a fault condition, integrated motor monitoring system 13 may respond faster than conventional monitoring units having separate control units, which may reduce the potential for damage resulting from a fault condition.

It will be apparent to those skilled in the art that various modifications and variations can be made to the disclosed integrated motor monitoring system without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. An integrated motor monitoring system, comprising:
a housing;
a motor disposed within the housing and configured to provide a power output;
at least one monitoring device communicatively coupled to the motor and configured to:
monitor an operational aspect of the motor; and
generate a data signal associated with the operational aspect; and
a controller, disposed within the housing and in communication with the at least one monitoring device, and configured to:
energize a plurality of field conductors of the motor;
monitor an energizing current associated with one or more of the plurality of field conductors; and
cause the at least one monitoring device to provide the data signal to the controller via one or more of the plurality of field conductors during one or more time periods that the monitored current associated with the one or more field conductors is substantially negligible.

2. The control system of claim 1, wherein the energizing of the plurality of field conductors further includes providing power signals to the plurality of field conductors of the motor sufficient to operate the motor.

3. The monitoring system of claim 1, wherein the at least one monitoring device includes a temperature sensor.

4. The monitoring system of claim 1, wherein the operational aspect includes a temperature associated with at least part of the motor.

5. The monitoring system of claim 1, wherein the at least one monitoring device is configured for selective coupling to a first field conductor among the plurality of field conductors.

6. The monitoring system of claim 5, further including at least one switch coupling the at least one monitoring device to the first field conductor of the motor.

7. The monitoring system of claim 6, wherein the controller is further configured to operate the at least one switch.

8. The monitoring system of claim 1, wherein the controller includes a switching circuit adapted to selectively energize the plurality of field conductors of the motor.

9. The monitoring system of claim 8, wherein the controller further configured to:
receive the data signal over the at least one of the plurality of field conductors; and
transmit the data signal to an external diagnostic tool over a power line.

10. The monitoring system of claim 8, wherein the switching circuit includes a plurality of switching elements, at least one of the plurality of switching elements coupled to a field conductor of the motor.

11. The monitoring system of claim 1, wherein the controller is further configured to:
receive a power signal from an external power source over a power line; and
transmit the data signal to an external diagnostic tool over the power line.

12. A method for monitoring a motor, comprising:
energizing a plurality of field conductors of a motor;
monitoring an energizing current associated with one or more of the plurality of field conductors; and
receiving data indicative of an operational aspect of the motor from one or more monitoring devices via one or more of the field conductors during one or more time periods that the monitored current associated with the one or more field conductors is substantially negligible.

13. The method of claim 12, further including receiving at least one data signal indicative of an operational aspect of the motor.

14. The method of claim 13, further including providing the at least one data signal to an external diagnostic tool.

15. The method of claim 12, wherein energizing the plurality of field conductors includes sequentially energizing the plurality of field conductors.

16. The method of claim 15, wherein enabling data communication includes providing a selective electrical path for data communication based on the sequential energizing of the plurality of field conductors.

17. The method of claim 12, wherein energizing the plurality of field conductors of the motor includes converting a DC power signal into a plurality of alternating power pulses.

18. A machine, comprising:
a power source configured to provide a power output;
an electronic control unit, operatively coupled to the power source and configured to monitor a plurality of electric systems associated with the machine;
an integrated motor monitoring system, comprising:
a housing;
a motor disposed within the housing;
at least one monitoring device communicatively coupled to the motor and configured to:
monitor at least one operational aspect of the motor; and
generate a data signal associated with the at least one operational aspect; and
a controller, disposed within the housing and in communication with the at least one monitoring device, and configured to:
energize a plurality of field conductors of the motor;
monitor an energizing current associated with one or more of the plurality of field conductors; and
operate a switch that selectively couples the at least one monitoring device to one or more of the plurality of field conductors during one or more time periods that the monitored current associated with the one or more field conductors is substantially negligible; and
receive the data signal from the at least one monitoring device via one or more of the plurality of field conductors.

19. The machine of claim 18, wherein the at least one monitoring device is configured for selective coupling to a first field conductor among a plurality of field conductors.

20. The machine of claim 19, further including at least one switch coupling the at least one monitoring device to the first field conductor of the motor.

21. The machine of claim 18, wherein the controller includes a switching circuit adapted to selectively energize the plurality of field conductors of the motor.

22. The machine of claim 21, wherein the controller is further configured to:
receive the data signal over the at least one of the plurality of field conductors; and
transmit the data signal to an external diagnostic tool over a power line.

23. The machine of claim 18, wherein the controller is further configured to:
   receive a power signal from an external power source over a power line; and
   transmit the data signal to an external diagnostic tool over the power line.

24. The system of claim 1, wherein causing the at least one monitoring device to provide the data signal to the controller via one or more of the plurality of field conductors includes:
   providing a data request signal to the at least one monitoring device when the monitored current associated with the one or more field conductors is substantially negligible;
   wherein the at least one data monitoring device is configured to provide the data signal in response to the data request signal during one or more time periods that the monitored current associated with the one or more field conductors is substantially negligible.

25. The system of claim 1, wherein causing the at least one monitoring device to provide the data signal to the controller via one or more of the plurality of field conductors further includes:
   operating a switch that selectively couples the at least one monitoring device to one or more of the plurality of field conductors during one or more time periods that the monitored current associated with the one or more field conductors is substantially negligible; and
   receive the data signal from the at least one monitoring device via one or more of the plurality of field conductors.

* * * * *